(12) United States Patent
Nicholas et al.

(10) Patent No.: US 8,671,405 B2
(45) Date of Patent: Mar. 11, 2014

(54) VIRTUAL MACHINE CRASH FILE GENERATION TECHNIQUES

(75) Inventors: Andrew Nicholas, Bellevue, WA (US); Rich Yampell, Bellevue, WA (US); Jacob Oshins, Seattle, WA (US); Rene Antonio Vega, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 12/751,991

(22) Filed: Mar. 31, 2010

(65) Prior Publication Data

US 2011/0246986 A1    Oct. 6, 2011

(51) Int. Cl.
  *G06F 9/455*     (2006.01)
(52) U.S. Cl.
  USPC .......................................... 718/1; 714/38.11
(58) Field of Classification Search
  None
  See application file for complete search history.

(56) References Cited

U.S. PATENT DOCUMENTS

| | | | |
|---|---|---|---|
| 6,769,077 B2 | 7/2004 | Vachon et al. | |
| 7,149,929 B2 | 12/2006 | Chaurasia | |
| 7,392,374 B2 | 6/2008 | Chandramouleeswaran et al. | |
| 7,484,127 B2 | 1/2009 | Babu | |
| 8,056,076 B1 * | 11/2011 | Hutchins et al. | 718/1 |
| 2007/0006226 A1 | 1/2007 | Hendel | |
| 2007/0094532 A1 | 4/2007 | Sengupta et al. | |
| 2008/0295077 A1 | 11/2008 | Sengupta et al. | |
| 2009/0024820 A1 | 1/2009 | Ponnuswamy | |
| 2009/0144483 A1 * | 6/2009 | Sakurai et al. | 711/100 |
| 2010/0083250 A1 * | 4/2010 | Nakai | 718/1 |
| 2011/0107103 A1 * | 5/2011 | Dehaan et al. | 713/171 |
| 2011/0231710 A1 * | 9/2011 | Laor | 714/38.11 |

OTHER PUBLICATIONS

"Mini Kernel Dump", High Reliable Capturing Crash Dumps for Linux, www.mkdump.sourceforge.net, (last updated Mar. 30, 2006) accessed Dec. 31, 2009, 5 pages.

* cited by examiner

*Primary Examiner* — Emerson Puente
*Assistant Examiner* — Dong Kim
(74) *Attorney, Agent, or Firm* — Tony Azure; Andrew Sanders; Micky Minhas

(57) ABSTRACT

Techniques for creating crash data in a virtualized environment are disclosed. In an embodiment of the present disclosure the techniques can be used when a guest operating system within a virtual machine may not have a sufficient mechanism for generating crash data.

20 Claims, 10 Drawing Sheets

VIRTUAL MACHINE CRASH FILE GENERATION TECHNIQUES

BACKGROUND

Operating systems crash from time to time due to a bug or a kernel panic and shut down, i.e., they crash. During a crash some operating systems create a crash file which can include information that may allow a support person or an automated system to identify the problem and recommend a corrective measure.

A component that does not rely on the operating system can be registered to create a crash file if the operating system enters an unstable state. When the operating system reboots the file can be detected and presented to a user for diagnostic purposes. Most computer systems boot from a backplane bus device like an integrated drive electronics device ("IDE device") or a peripheral component interconnect bus and operating system developers typically have written the operating system code to use these devices to store crash files. These operating systems are typically configured to load a copy driver, i.e., a shadow storage driver, for the boot device at boot time and pre-initialized it as a crash stack, i.e., configure it to execute a crash generating program specific to the operating system at crash. In the event that the operating system crashes, the shadow storage driver can execute the program; generate a crash file; and write the crash file to storage before the computer shuts down.

This technique works well in a physical environment, however in a virtualized environment the guest operating system, i.e., an operating system within a virtual machine, may not have a sufficient mechanism for generating a crash file in a virtualized environment. For example, the guest operating system may not have booted from an emulation of a well-know device such as a backplane bus based controller. Instead, the guest could have booted from a protocol bus based storage stack such as an internet small computer system interface ("iSCSI") or the fibre channel protocol. For example, protocol bus based storage stacks typically have their crash dump driver provided by the hardware manufacturer, but in this situation, the hardware is virtual and therefore the guest operating system may not have a crash stack to load for the protocol bus. In another example situation, the boot device may not be an emulation of a well-known device for which there was an existing and mature device driver within the guest operating system. In these situations if the guest operating system crashed it would restart without creating a crash file. Since there is enormous value in obtaining a crash file, the situation where a guest operating system can not create one is unacceptable. However since it is costly and difficult to reengineer each guest operating system, and one of the important aspects of virtual machine technology is that it allows "old" operating systems to operate, a problem in the art exists.

SUMMARY

An example embodiment of the present disclosure describes a method. In this example, the method includes, but is not limited to configuring a hypervisor to obtain crash data for a guest operating system configured to execute in a virtual machine in response to detecting that the guest operating system crashed; and configuring the hypervisor to send the crash data to the virtual machine after the guest operating system is in control of the virtual machine. In addition to the foregoing, other aspects are described in the claims, drawings, and text forming a part of the present disclosure.

An example embodiment of the present disclosure describes a method. In this example, the method includes, but is not limited to configuring an input/output controller emulator to execute in a virtual machine in response to detecting that a guest operating system crashed; receiving, by the input/output controller emulator, crash data for the guest operating system from information stored in the guest resources of the virtual machine; and storing, by a hypervisor, the crash data for the guest operating system. In addition to the foregoing, other aspects are described in the claims, drawings, and text forming a part of the present disclosure.

An example embodiment of the present disclosure describes a method. In this example, the method includes, but is not limited to mounting a disk in a hypervisor in response to starting a guest operating system that previously crashed, wherein the disk includes a guest operating system configured to execute in a virtual machine; and writing, by the hypervisor, crash data for the guest operating system to a predetermined location on the disk, wherein the crash data includes information obtained from at least guest physical addresses of the virtual machine. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
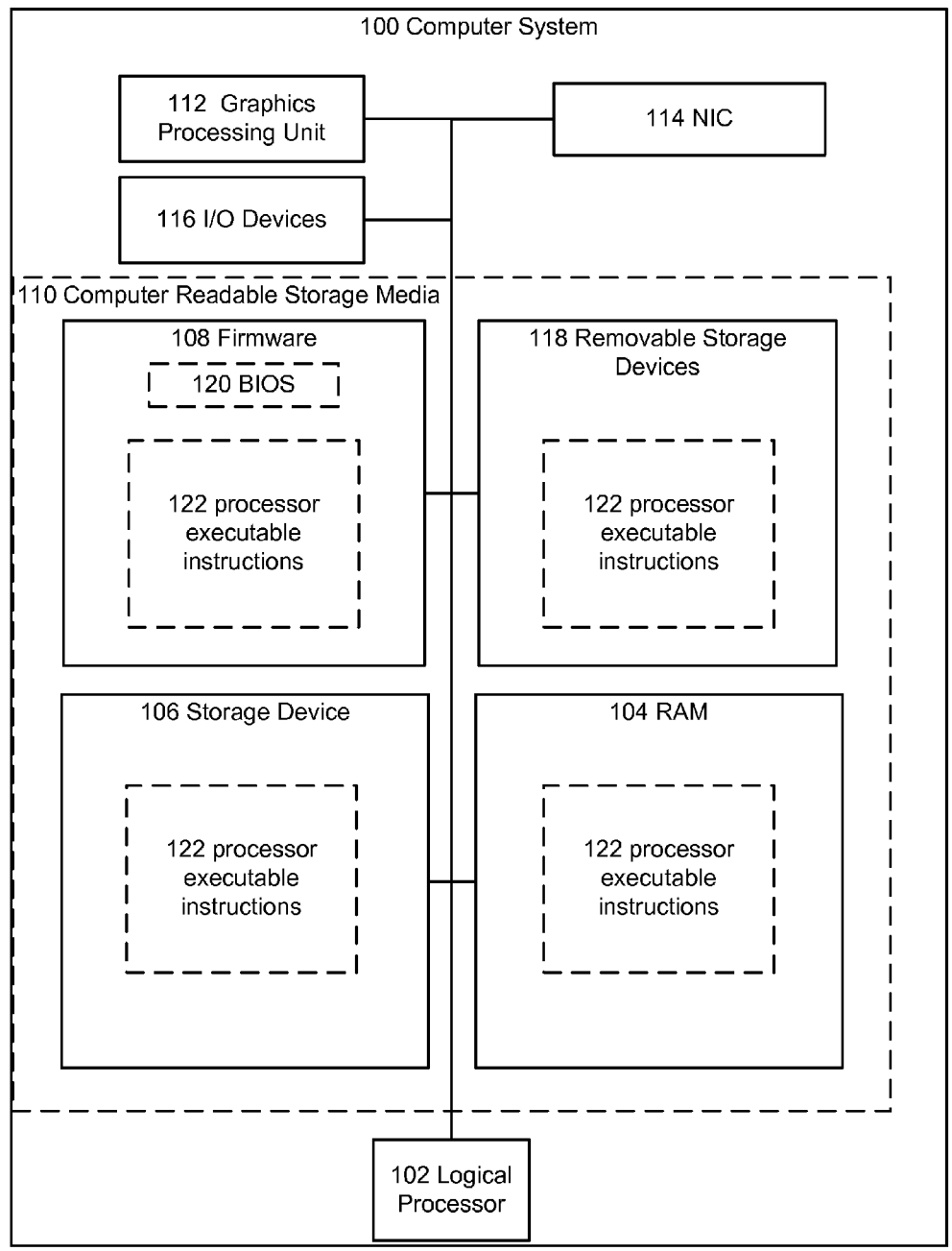
FIG. 1 depicts an example computer system wherein aspects of the present disclosure can be implemented.

Embodiments may execute on one or more computer systems. FIG. 1 and the following discussion are intended to provide a brief general description of a suitable computing environment in which the disclosure may be implemented.

The term circuitry used throughout the disclosure can include hardware components such as hardware interrupt controllers, hard drives, network adaptors, graphics processors, hardware based video/audio codecs, and the firmware used to operate such hardware. The term circuitry can also include microprocessors, application specific integrated circuits, and/or one or more logical processors, e.g., one or more cores of a multi-core general processing unit configured by firmware and/or software. Logical processor(s) can be configured by instructions embodying logic operable to perform function(s) that are loaded from memory, e.g., RAM, ROM, firmware, and/or mass storage. In an example embodiment where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include a logical processor 102, e.g., an execution core. While one logical processor 102 is illustrated, in other embodiments computer system 100 may have multiple logical processors, e.g., multiple execution cores per processor substrate and/or multiple processor substrates that could each have multiple execution cores. As shown by the figure, various computer readable storage media 110 can be interconnected by one or more system busses which couples various system components to the logical processor 102. The system buses may be any of several types of bus structures including a memory bus or memory controller, a peripheral bus, and a local bus using any of a variety of bus architectures. In example embodiments the computer readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, digital video disks, and Bernoulli cartridges.

The computer readable storage media 110 can provide non volatile and volatile storage of processor executable instructions 122, data structures, program modules and other data for the computer 100 such executable instructions that effectuate manager 250 described in the following figures. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by logical processor 102 including an operating system and/or application programs.

Commands and information may be received by computer 100 through input devices 116 which can include, but are not limited to, a keyboard and pointing device. Other input devices may include a microphone, joystick, game pad, scanner or the like. These and other input devices are often connected to the logical processor 102 through a serial port interface that is coupled to the system bus, but may be connected by other interfaces, such as a parallel port, game port or universal serial bus (USB). A display or other type of display device can also be connected to the system bus via an interface, such as a video adapter which can be part of, or connected to, a graphics processor 112. In addition to the display, computers typically include other peripheral output devices (not shown), such as speakers and printers. The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through a network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
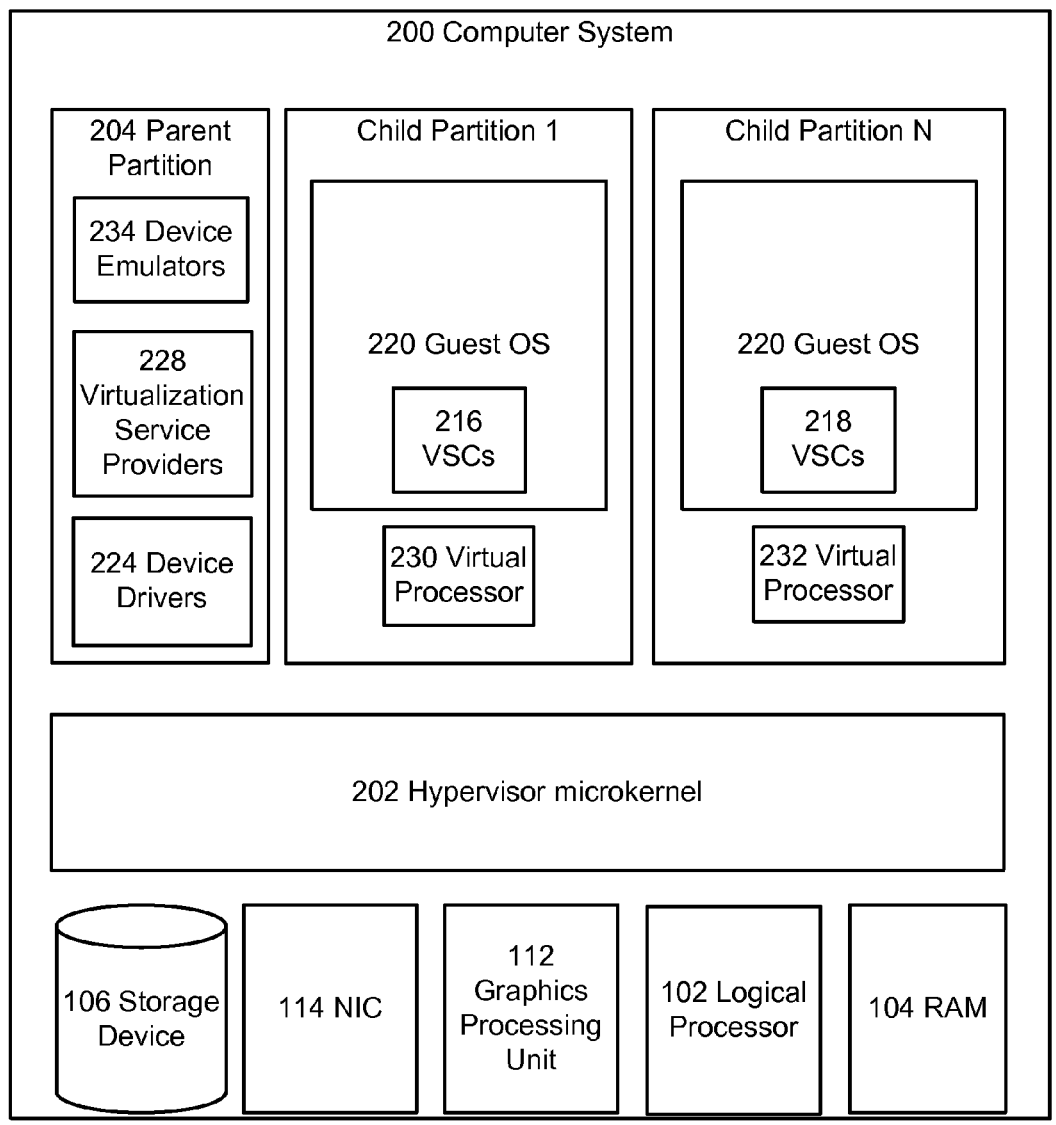
FIG. 2 depicts an operational environment for practicing aspects of the present disclosure.
Figure 3:
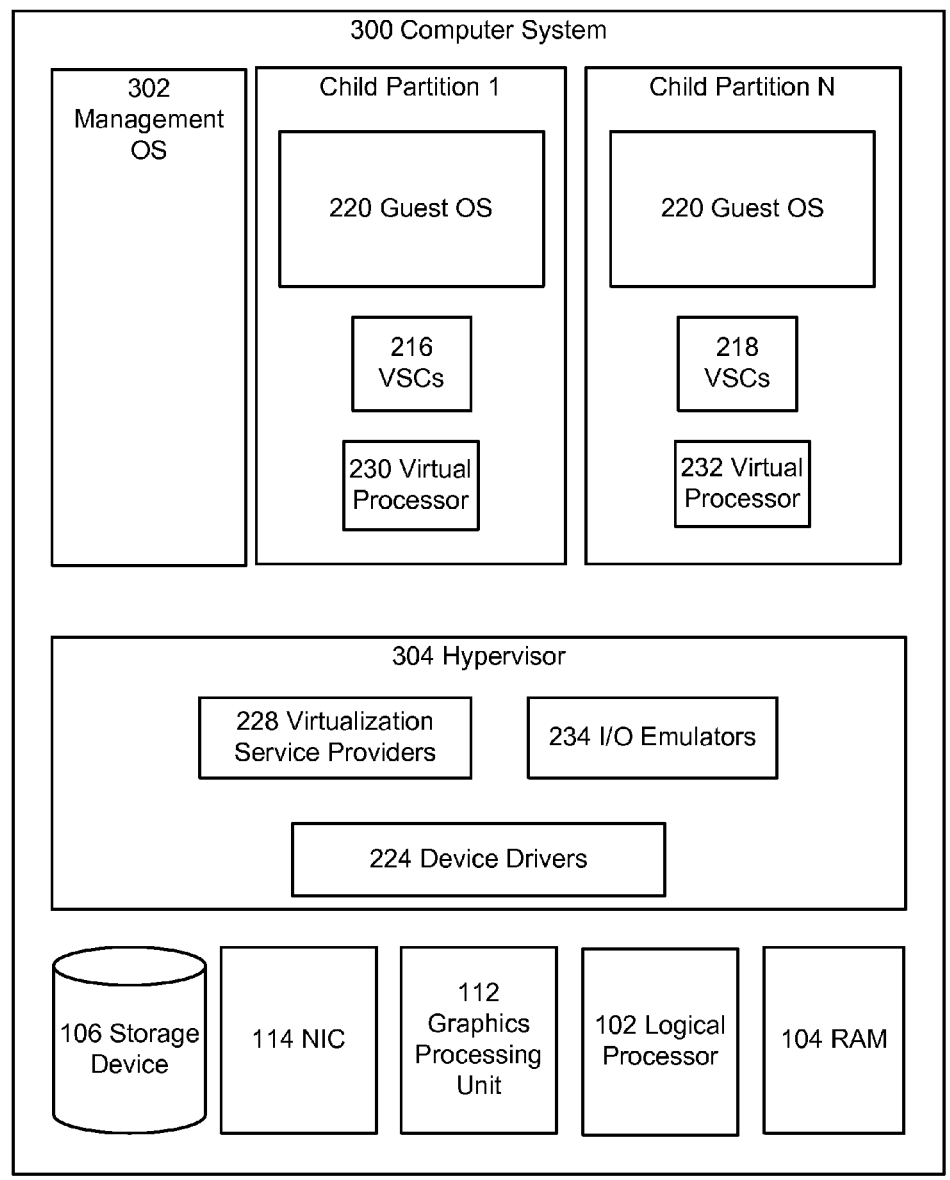
FIG. 3 depicts an operational environment for practicing aspects of the present disclosure.

Referring now to FIGS. 2 and 3, they depict high level block diagrams of computer systems 200 and 300 configured to manage virtual machines. In example embodiments of the present disclosure computer systems 200 and 300 can include elements described in FIG. 1 and the following. As shown by the figures, different architectures can exist; however, they generally have similar components. For example, FIG. 2 illustrates an operational environment where a hypervisor, which may also be referred to in the art as a virtual machine monitor, is split into a microkernel 202 and a parent partition 204 whereas FIG. 3 illustrates hypervisor 304 as including elements found in the parent partition 204 of FIG. 2.

Turning to FIG. 2, hypervisor microkernel 202 can be configured to control and arbitrate access to the hardware of computer system 200. Broadly, hypervisor microkernel 202 can generate execution environments called partitions such as child partition 1 through child partition N (where N is an integer greater than 1). In embodiments a child partition is the basic unit of isolation supported by hypervisor microkernel 202. That is, each child partition can be mapped to a set of hardware resources, e.g., memory, devices, logical processor cycles, etc., that is under control of hypervisor microkernel 202 and hypervisor microkernel 202 can isolate processes in one partition from accessing another partition's resources, e.g., a guest operating system in one partition may be isolated from the memory of another partition and thus may not be able to detect memory addresses outside of it's partition. In embodiments hypervisor microkernel 202 can be a standalone software product, a part of an operating system, embedded within firmware of the motherboard, specialized integrated circuits, or a combination thereof.

Continuing with the description of FIG. 2, parent partition component 204 is illustrated, which can also be also thought of as similar to domain 0 of Xen's open source hypervisor.

Parent partition 204 in this operational environment can be configured to provide resources to guest operating systems executing in the child partitions 1–N by using virtualization service providers 228 (VSPs) that are typically referred to as back-end drivers in the open source community. Broadly, VSPs 228 can be used to multiplex the interfaces to the hardware resources by way of virtualization service clients (VSCs) (typically referred to as front-end drivers in the open source community) and communicate with the virtualization service clients via communication protocols. As shown by the figures, virtualization service clients can execute within the context of guest operating systems. These drivers are different than the rest of the drivers in the guest in that they may be supplied with a hypervisor, not with a guest. Device emulators 234 are also illustrated and are used to support device divers which are designed to interact with hardware, but when that hardware isn't actually available to a virtual machine. In this example architecture parent partition 204 can gate access to the underlying hardware.

Hypervisor microkernel 202 can enforce partitioning by restricting a guest operating system's view of system memory. Guest memory is a partition's view of memory that is controlled by a hypervisor. The guest physical address can be backed by system physical address (SPA), i.e., the memory of the physical computer system, managed by hypervisor. As shown by the figure, in an embodiment the GPAs and SPAs can be arranged into memory blocks, i.e., one or more pages of memory. When a guest writes to a block using its page table the data is actually stored in a block with a different system address according to the system wide page table used by hypervisor.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in an embodiment including multiple logical processors, virtual processors can be simultaneously executed by logical processors while, for example, other logical processor execute hypervisor instructions. The combination of virtual processors and memory in a partition can be considered a virtual machine.

Guest operating systems can include any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a logical processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Referring now to FIG. 3, it illustrates an alternative architecture to that described above in FIG. 2. FIG. 3 depicts similar components to those of FIG. 2; however in this example embodiment hypervisor 304 can include the microkernel component and components from the parent partition 204 of FIG. 2 such as the virtualization service providers 228 and device drivers 224 while management operating system 302 may contain, for example, configuration utilities used to configure hypervisor 304. In this architecture hypervisor 304 can perform the same or similar functions as hypervisor microkernel 202 of FIG. 2; however, in this architecture hypervisor 304 can be configured to provide resources to guest operating systems executing in the child partitions. Hypervisor 304 of FIG. 3 can be a stand alone software product, a part of an operating system, embedded within firmware of the motherboard or a portion of hypervisor 304 can be effectuated by specialized integrated circuits.

In embodiments of the present disclosure crash data can be obtained for a crashed guest operating system. Crash data, for example, is intended to include enough information so that a determination can be made as to what caused the crash. The crash data can be in final format or could be further processed. In some example embodiments crash data can be generated from an image of memory. The crash data can include, processor settings, guest operating system kernel data structures, a list of processes in memory, the stack trace, e.g., list of processes that were run on a virtual processor, and in at least one embodiment the page file.

Figure 4:
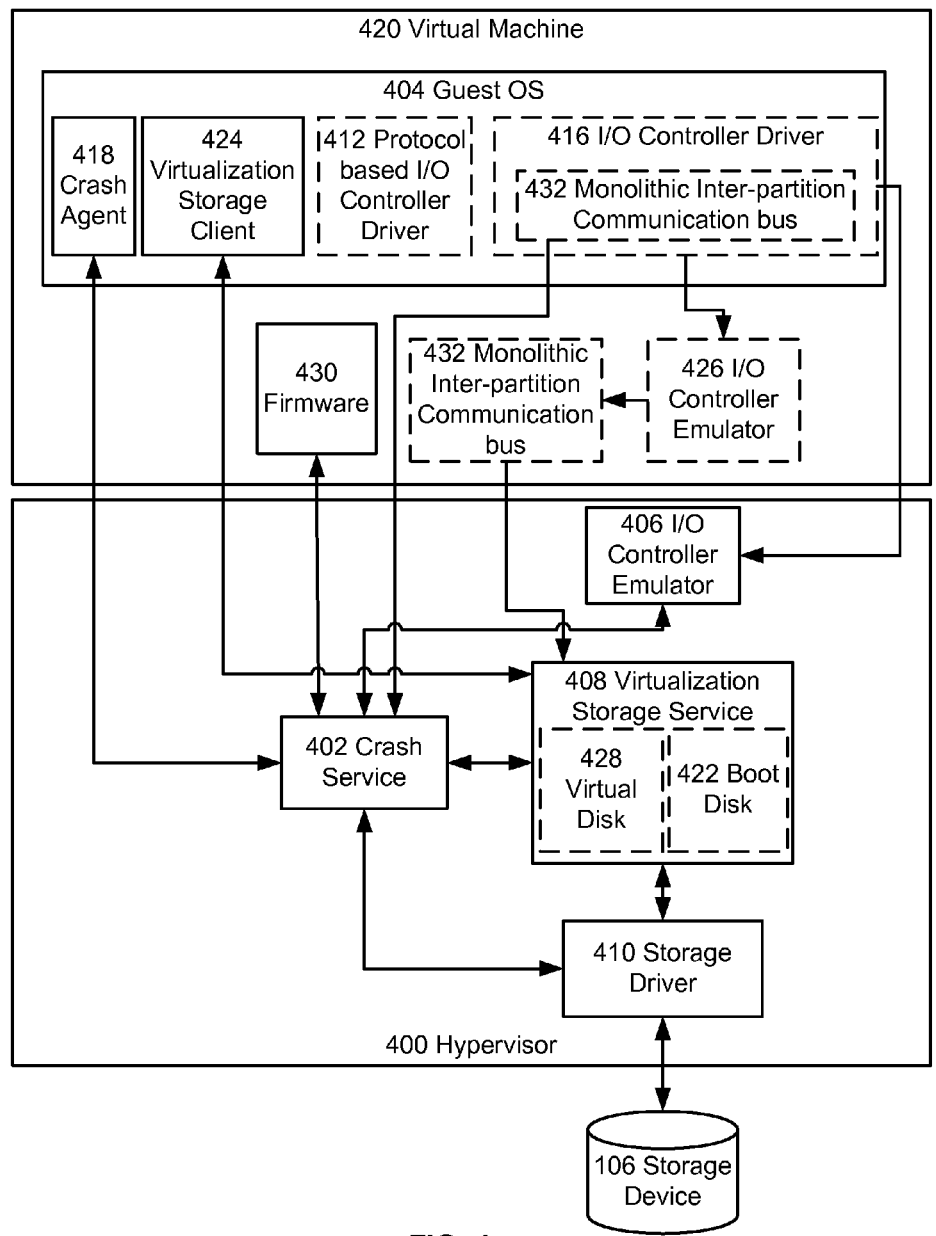
FIG. 4 illustrates an operational environment for practicing the present disclosure.

Turning to FIG. 4, it illustrates an operational environment for describing aspects of the present disclosure. FIG. 4 includes elements in dashed lines, e.g., IO controller driver 416, which indicates that they are considered optional. FIG. 4 illustrates crash service 402 which can be effectuated circuitry, e.g., a module of instructions in hypervisor 400 configured to be executed by a processor. In the illustrated embodiment, crash service 402 can facilitate crash services for virtual machines such as virtual machine 420. Crash service 402 can include various configuration options that allow it to implement different crash data generating techniques depending on the configuration parameters of guest operating system 404.

For example, hypervisor 400 and/or virtual machine 420 can generate crash data when guest operating system 404 and any module dependent on guest operating system resources crashes, e.g., virtualization storage client 424. The selection of which crash data generating technique crash service 402 implements could depend on factors such as whether the guest operating system is using full volume encryption or whether hypervisor 400 can obtain access to the boot disk. While in embodiments of the present disclosure herein described techniques can be used to create crash data when backplane controllers are not used in the boot process, one of skill in the art can also appreciate that the herein describe techniques could be used to enhance virtual machines that use backplane controllers to boot.

Continuing with the description of FIG. 4, it illustrates hypervisor 400 which could have an architecture similar to that described on FIG. 2 or FIG. 3, i.e., hypervisor could include a separate parent partition 204 and microkernel 202. Thus, in certain embodiments operational elements in hypervisor 400 could be executing within a parent partition.

Guest operating system 404 is shown including a virtualization storage client 424 and a crash agent 418. For example virtualization storage client 424 can be a paravirtualization driver that could be installed within the guest operating system 404. Virtualization storage client 424 could expose a storage stack to guest operating system 404 that is similar to a hardware device but uses a high level protocol to send/receive information to hypervisor 400. Crash service 402 can operate in conjunction with crash agent 418 which can be, for example, a paravirtualization module that has been injected into virtual machine 420, e.g., installed as a driver, added to guest OS's kernel, or booted by firmware 430 into memory of virtual machine 420. Generally speaking, crash agent 418 can be a monolithic module of instructions that interact with guest operating system 404 to aid in a crash situation as is described in more detail below.

Continuing with the description of FIG. 4, IO controller emulator 426 and IO controller emulator 406 can be used to operate with crash stack IO controller drivers. For example, IO controller driver 416 writes to registers and IO mapped memory of IO controller emulators which can cause hypervisor intercepts. Hypervisor 400 can then pass the values written by IO controller driver 416 to an IO controller emulator which can run and determine what the driver attempted to write. In an example embodiment IO controller emulator 426 can use monolithic inter partition communication bus 432 to send messages to virtualization storage stack 408. In this example embodiment the inter partition communication bus is monolithic because it would not require any external dependencies, e.g., operating system resources. Thus, in this embodiment if a crash occurs monolithic inter partition communication bus should still be able to operate. In an embodiment of the present disclosure monolithic inter-partition communication bus 432 can include similar features to those described in U.S. patent application Ser. No. 11/128,647 entitled "Partition Bus," the contents of which is herein incorporated by reference in its entirety.

Virtualization storage service 408 can manage storage for virtual machine 420 by communicating with virtualization storage client 424. For example, virtual machine storage service 408 can be configured to communicate with physical storage devices such as a SAN storage target on behalf of virtual machines and communicate with virtualization storage client 424 via an inter partition communication bus. As shown by the figure, virtualization storage service 408 can expose a boot disk 422 to virtual machine 420. In a specific example embodiment virtual machine boot disk 422 can be a LUN. In this example virtual machine storage service 408 can be configured to expose the boot disk to guest operating system 404; receive I/O requests virtualization from storage client 424; and route them to the boot disk. In another instance virtual machine boot disk 422 can be stored on a sub-allocated LUN. In this example virtual machine storage service 408 can be configured to generate a virtual hard drive; expose it to virtual machine 420; and store it as virtual hard drive (VHD) files on the LUN. A VHD file specifies a virtual machine hard disk that can be encapsulated within a single file in physical storage. Virtual machine storage service 408 can parse the file and expose a disk to guest operating system 404 as physical storage. The virtual hard disks generated by virtual machine storage service 408 can be attached to a bus that is accessible to the guest operating systems in a way that appears like it is locally attached guest operating system 404.

In certain example embodiments guest operating system 404 may not be using virtualization storage service 408 for storage, e.g., guest operating system may be using an iSCSI target as a boot disk. In this example embodiment guest operating system 404 could include a SCSI driver coupled to a TCP/IP stack. In this example embodiment the target appears as a locally attached disk and SCSI commands can be sent to the disk via IP packets. Guest operating system 404 in this example can communicate directly with the target over a networking protocol and hypervisor 400 may not have access or control of the storage device used to boot guest operating system 404.

Various crash approaches can be used to obtain crash data and send it to guest operating system 404 some of which can be block based and others can be file system based. In storage one of the highest layers is a "file system" which is a logical abstraction of data that is broken up into files, each of which can be identified by a path and a name. Below the file system, the physical storage is usually managed in blocks where reads a where reads and writes are done in terms of an offset and range within a logical block (on disk, or tape, etc.). The blocks are numbered from 0 through some maximum and they all have the same size. The job of a file system is to map a file abstraction onto a block abstraction. In some operating systems, everything that happens after a kernel panic can be considered block-oriented because the file systems are not used any more.

One crash technique involves crash service 402 generating crash data after guest operating system 404 crashes. In this embodiment guest operating system 404 could be configured to identify its version with crash agent 418 when it boots and crash service 402 can load a program associated with the version and be configured to obtain crash data. In an example embodiment crash service 402 can include at least a crash generating program for guest operating system 404. Each guest operating system can have a specific format used to generate crash data at crash time and crash service 402 can be configured to include a library of crash programs and select the one associated with guest OS 404.

Continuing with this example, after guest operating system 404 crashes crash data can be generated and stored. In an example embodiment crash data can be stored by the host until guest operating system 404 reboots. In this situation crash service 402 may not be operable to write to the file system of guest operating system's boot disk, e.g., the file system may be encrypted, or the boot disk may not be available.

Continuing with the example above, hypervisor 400 can send it back to guest operating system when it reboots and has loaded, or mount the boot disk during reboot and commit the crash data to the boot disk. In the instance where hypervisor 400 sends the crash data to guest operating system 404 after reboot, hypervisor 400 can use one of a variety of techniques. For example, crash service 402 can wait until guest operating system 404 reboots and then send the generated crash data to crash agent 418 which can direct guest operating system 404 to write it to storage. In another example embodiment, virtualization storage service 408 can be configured to inject virtual disk 428 which can include the crash data into virtual machine 420. Crash agent 418 can receive a signal and obtain the crash data from virtual disk 428 and direct guest operating system 404 to write it to disk. In the same, or an alternative embodiment crash agent 418 can be configured to invoke a process to display the crash data to a user and/or send crash data to a remote computer system for diagnosis.

In another example embodiment, crash service 402 can store the crash data on the boot disk in a predetermined location. In this situation crash service 402 may be able to write to boot disk 422 because, for example, guest operating system 404 is not encrypting data or hypervisor 400 includes the encryption key. Crash service 402 can request that virtualization storage service 408 open virtual machine boot disk 422 within hypervisor 400 and write crash data to it. In this example when guest operating system 404 loads it can detect the crash data.

In another embodiment, instead of generating the crash data crash service 402 can configure IO controller driver 416 to generate crash data. In an example embodiment IO controller driver 416 can be a paravirtualization driver and can generate crash data and send it to hypervisor 400. In this example, crash agent 418 could be configured to direct guest operating system 404 to load IO controller driver 416 and pre-initialize it to operate as a crash stack even though the IO controller driver 416 is not associated with the boot disk. Guest operating system 404 would then pre-initialize IO controller driver 416 to run the guest OS's crash file generating program upon crash. As shown by the figure, in this example IO controller driver 416 may include monolithic inter-partition communication bus 432 and use it to send crash data to crash service 402. In this example embodiment hypervisor 400 would not need to understand how crash files are created. Similar to that described above, crash service 402 can obtain the crash data and provide it to guest operating system 404 using one of the above mentioned techniques.

In another example embodiment IO controller driver 416 can be a backplane bus controller driver, e.g., an non-paravirtualized IDE controller driver. In this example embodiment crash agent 418 could be configured to direct guest operating system 404 to load IO controller driver 416 and pre-initialize it to operate as a crash stack even though a backplane bus device is not the boot disk. In this example the IO controller driver 416 can write crash data to an IO controller emulator executing within hypervisor 400 or an IO controller emulator in virtual machine 420. Similar to that described above, crash service 402 can obtain the crash data and provide it to guest operating system 404 using one of the above mentioned techniques.

In yet another example embodiment boot firmware, e.g., firmware 430, can be configured to store crash data on the boot disk. For example, upon crash guest operating system is unstable and the firmware image can be used to obtain crash data since it does not rely on operating system dependencies and it can write to the boot disk. Firmware 430 is typically used to boot a guest operating system because it is far more simple to boot guest operating systems the same way it is booted on a physical machine than configure hypervisor 400 to place it in memory. Boot firmware 430 can start boot services and can load a boot loader into guest physical addresses that can boot guest operating system. Boot loader can then load the kernel files, drivers, file system, etc.

In this example embodiment guest operating system 404 can be configured to not exit from boot services and then crash agent 418 can be configured to pass control back to firmware 430 at crash. In this example firmware 430 can then be configured to write the crash data to boot disk 422. In a specific embodiment crash agent 418 can direct guest operating system 404 to load IO controller driver 416. Guest operating system 404 can be configured to pre-initialize it as crash stack and configure it to write crash data to guest physical addresses used by firmware 430 and firmware 430 can then write the crash data to boot storage 422. In an example embodiment firmware 430 may not be resilient to changes in the state of virtual machine 420 and IO controller driver 416 can be configured to send a signal to hypervisor 400 directing it to place virtual machine 420 back into a state that firmware 430 saw when boot services were suppose to be exited so that firmware 430 can write to boot device 422.

The following are a series of flowcharts depicting operational procedures. For ease of understanding, the flowcharts are organized such that the initial flowcharts present implementations via an overall "big picture" viewpoint and subsequent flowcharts provide further additions and/or details. Furthermore, one of skill in the art can appreciate that the operational procedure depicted by dashed lines are considered optional.

Figure 5:
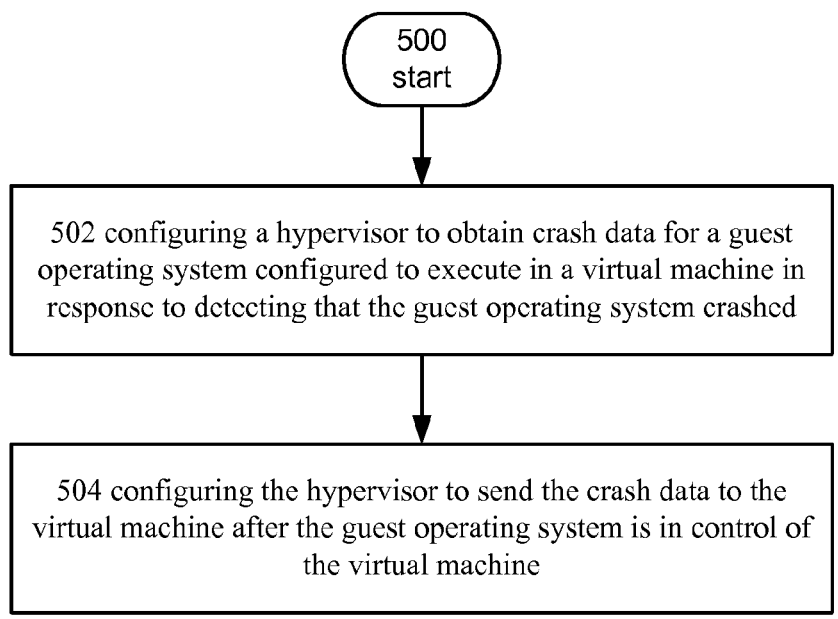
FIG. 5 depicts operational procedure for practicing aspects of the present disclosure.

Turning now to FIG. 5, it shows an operational procedure for practicing aspects of the present disclosure including operations 500, 502, and 504. Operation 500 begins the operational procedure and operation 502 shows configuring a hypervisor to obtain crash data for a guest operating system configured to execute in a virtual machine in response to detecting that the guest operating system crashed. For example, and turning to FIG. 5, hypervisor 400 can be configured to obtain crash data for guest operating system 404 in virtual machine 420 after the guest crashes. For example, a logical processor can execute hypervisor instructions that configure the state of hypervisor to obtain crash data. Hypervisor 400 can then use one of the variety of techniques described above to obtain crash data for guest operating system 404.

Hypervisor 400 can be notified that guest operating system 404 crashed by crash agent 418. Crash agent 418 can be configured to detect when guest operating system 404 crashes instead of, for example, simply shutting down and send this information to hypervisor 400. For example, crash agent 418 can register with guest operating system 404 and if a crash occurs crash agent 418 can detect that guest operating system 404 is entered a crash routine.

Turning now to operation 504, it shows configuring the hypervisor to send the crash data to the virtual machine after the guest operating system is in control of the virtual machine. For example, and continuing with the description of FIG. 5, hypervisor 400 can be configured to send the crash data to virtual machine 420 after guest operating system 420 is in control of the virtual machine, e.g., the normal operating configuration of the guest operating system where it is capable of running applications, scheduling threads on a virtual processor, etc.

In an example embodiment crash agent 418 can receive the crash data from hypervisor 420 and write it to the file system of guest operating system 420. For example, when guest operating system 404 is running it has access to its boot disk wherever it is, e.g., on an iSCSI target, in a VHD file, etc. In this example embodiment the crash data can be written to a file in the file system of guest operating system 404 and stored on boot disk 422. Crash agent 418 can also invoke a crash analysis program in guest operating system 404 to have it display the crash data to a user or send it to a remote database for further processing. In this example crash agent 418 can be configured to access an API in the guest operating system 404 and invoke the process and, for example, pass the process a copy of the crash data to it.

Figure 6:
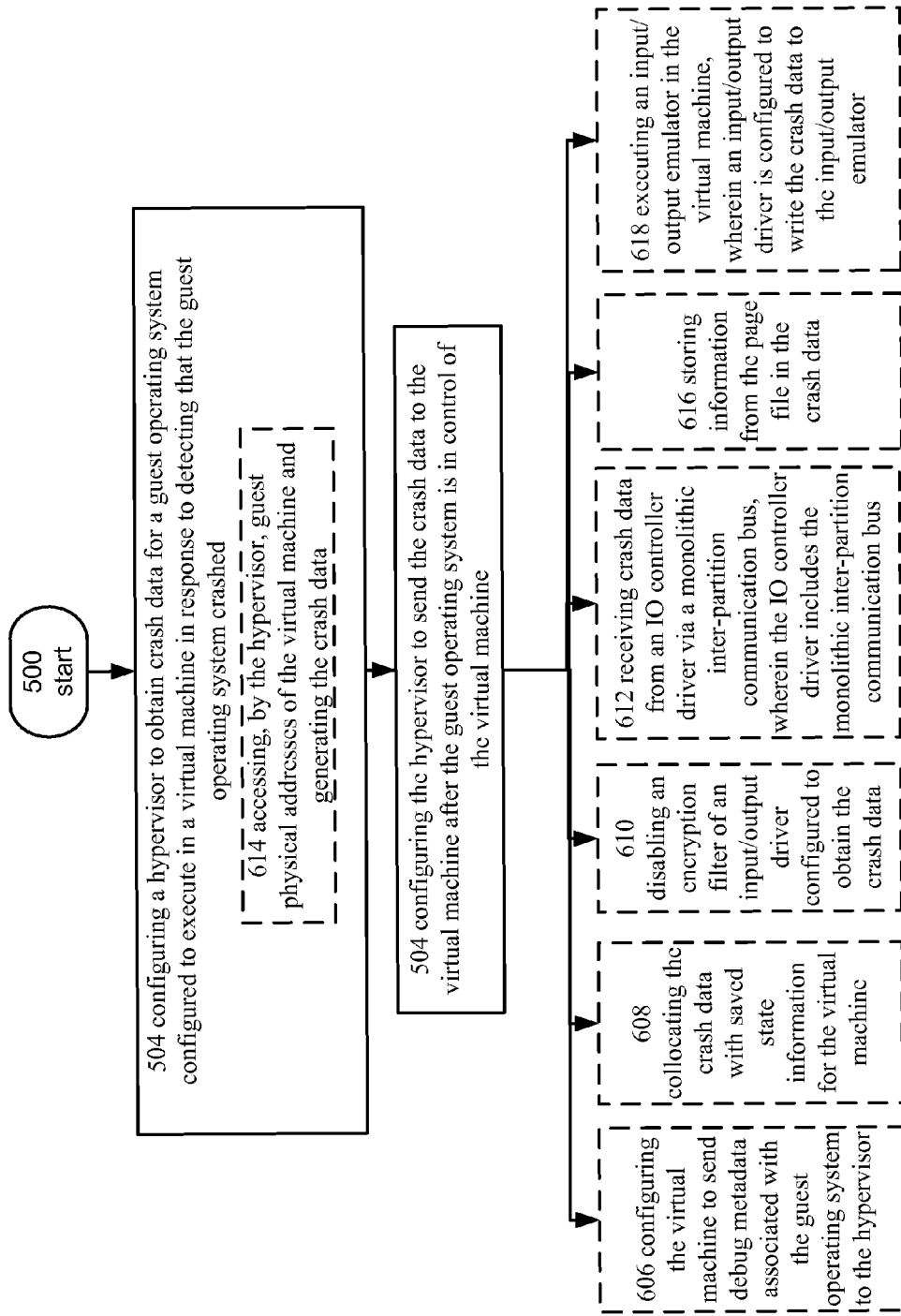
FIG. 6 depicts an alternative embodiment of the operational procedure of FIG. 5.

Turning now to FIG. 6, it illustrates an alternative embodiment of the operational procedure of FIG. 5 including operations 606-620. Operation 606 illustrates configuring the virtual machine to send debug metadata associated with the guest operating system to the hypervisor. For example, in an embodiment of the present disclosure a component in virtual machine 420, e.g., crash agent 418, can be configured, e.g., programmed, to obtain debug metadata and send it to hypervisor 400. This operation can be useful in the situation where hypervisor 400 creates the crash data. In an example embodiment the debug metadata can contain enough information to use symbolic debugging symbols, which can allow a debugger to find the kernel's internal data structures and to parse them. For example, the version of the kernel could be included within the debug metadata.

One of the internal structures that can be obtained is a loaded module list. This list may identify the base addresses of every other image in memory and what version of those images were loaded. In an example embodiment a module can include a blocks of code for an executable file, e.g., a PCI driver, the kernel of guest OS, an Ethernet driver, etc., and the list can identify the executable and the guest physical addresses the module occupies. From the loaded module list a debugger may be able to identify a list of executing processes.

Continuing with the description of FIG. 6, operation 608 shows collocating the crash data with saved state information for the virtual machine. For example, in an embodiment of the present disclosure hypervisor 440 can be configured to store the crash data with saved state information for virtual machine 420. For example, the saved state of a virtual machine is an image of the virtual machine at a point in time so that a user can return to that point at a later date. The state information can include configuration information, virtual processor settings, state of emulators for the virtual machine, list of pending IO jobs, etc. In an example embodiment the state information can be sent to another physical computer and the virtual machine can be instantiated. The state information can be stored in a file in hypervisor 400, e.g., parent partition portion 204. Thus, in this example embodiment the crash data can be migrated from one physical computer to another along with the state information for virtual machine 420. In the event that a crash occurs and virtual machine 420 is migrated before it is restarted, a crash service on the new physical computer system can detect that crash data exists and send the crash data to the guest when it restarts.

Continuing with the description of FIG. 6, operation 610 shows disabling an encryption filter of an input/output driver configured to obtain the crash data. For example, in an embodiment of the present disclosure guest operating system 404 may be using a full-volume encryption plug in to write to its file system. In an example embodiment where virtual machine 420 creates the crash data and crash service 402 sends it to guest operating system 404 after it reboots, an encryption plug-in to IO controller driver 416 can be disabled by crash agent 418. If the plug-in is not disabled the crash data may be encrypted again by protocol based IO controller driver 412 when it is written to storage thus making it useless.

Turning to operation 612, it illustrates receiving crash data from an IO controller driver via a monolithic inter-partition communication bus, wherein the IO controller driver includes the monolithic inter-partition communication bus. For example, and turning to FIG. 4, in an example embodiment of the present disclosure crash service 402 can receive crash data via a monolithic inter-partition communication bus 432 executing within IO controller driver 416. For example, in an embodiment IO controller driver 416 can be a paravirtualization driver and can be configured to use a copy of an inter-partition communication bus to send crash data to crash service 402. Crash agent 418 can configure IO controller driver 416 prior to crash. For example, crash agent 418 can direct guest operating system 404 to load IO controller driver 416 and pre-initialize it to operate as a crash stack. Guest operating system 404 would then pre-initialize IO controller driver 416 to run the guest OS's crash data generating program upon crash. Instead of attempting to write to an emulator, IO controller driver 416 can send a message indicative of crash data to crash service 402 via monolithic inter-partition communication bus 432.

Continuing with the description of FIG. 6, operation 614 shows accessing, by the hypervisor, guest physical addresses of the virtual machine and generating the crash data. For example, in an example embodiment hypervisor 400 can execute crash service 402 which can generate crash data for guest operating system 404. For example, upon crash hypervisor 400 can stop guest operating system 404 from running and open up guest physical addresses allocated to virtual machine 420. Hypervisor 400 can copy an image of at least a portion of the information in the guest physical addresses to crash service 402 which can create crash data from the image.

In this example embodiment crash service 402 can be configured to create the crash data prior to crash. For example, upon boot crash client 418 can send a signal to crash service 402 identifying what version the guest operating system is and crash service 402 can determine if it includes a crash program. Hypervisor 400 can then be configured to run crash service 402 if a crash is detected. In this example crash agent 418 can be invoked upon a kernel panic and control can be passed to hypervisor 400. Hypervisor 400 can then stop virtual machine 420 and run crash service 402 which can request that the memory of guest operating system 404 be made available to it.

Operation 616 shows storing information from the page file in the crash data. For example, in an embodiment of the present disclosure the contents of the page file can be stored in the crash data. Some operating systems store the crash data on the area of the boot disk where the page table of the file system is stored; however, since hypervisor 400 is storing the crash data the page file does not have to be overwritten. In this example crash agent 418 or crash service 402 can be configured to obtain the blocks of data that includes the page file and store it in crash data. For example, by having the page file a person may identify what was paged out and this may make it easier to determine what caused the crash.

Turning to operation 618, it illustrates executing an input/output emulator in the virtual machine, wherein an input/output driver is configured to write the crash data to the input/output emulator. For example, in an embodiment of the present disclosure IO controller emulator 426 can be configured to use guest IO resources, e.g., run from guest physical memory or is attached to IO space, and IO controller driver 416 can be configured to use emulator 426 in case of a crash. In an example embodiment guest operating system 404 could have booted from a protocol based storage device and in this example a regular storage driver, e.g., an IDE controller driver in guest operating system 404, could be registered as the crash handler. Similar to that above, crash agent 418 could invoke a process after guest operating system is in control of the virtual machine to load IO controller driver 416; pre-initialize the driver as the crash handler; and configure it to use the resources associated with IO controller emulator 426.

Boot firmware 430 can load IO controller emulator 426 into guest physical addresses and report a resource range for the IO controller emulator 426 to guest operating system as resources of a controller and that the guest physical addresses containing emulator 426 are unusable. In this way guest operating system 404 will not attempt to write to the guest physical memory including emulator 426 or access its IO ports and IO mapped memory. The resources used by IO controller emulator 426 can be different than the resources traditionally used by a guest operating system. For example, boot firmware 430 can attach IO controller emulator 426 to registers that are not usually used by an IO controller. When IO controller driver 416 attempts to access anything in the resource range of IO controller emulator 426, e.g., IO registers or memory mapped IO space, it can cause hypervisor 400 to trap access to the resource and hypervisor 400 can suspend the virtual processor running the guest. A message including the information IO controller driver 416 attempted to put into the resource range can then be sent to IO controller emulator 426 and the virtual processor can run IO controller emulator 426 to process the information.

After IO controller emulator 426 processes the information it can send a high-level message indicative of crash data via a monolithic inter-partition communication bus, i.e., an instance of inter-partition communication bus that does not rely on dependencies in guest operating system 404, to virtualization storage service 408. In an example embodiment virtualization storage service 408 can send the crash data to crash service 402 for storage on storage device 106. After reboot crash service 402 can send the crash data to guest operating system 404

Figure 7:
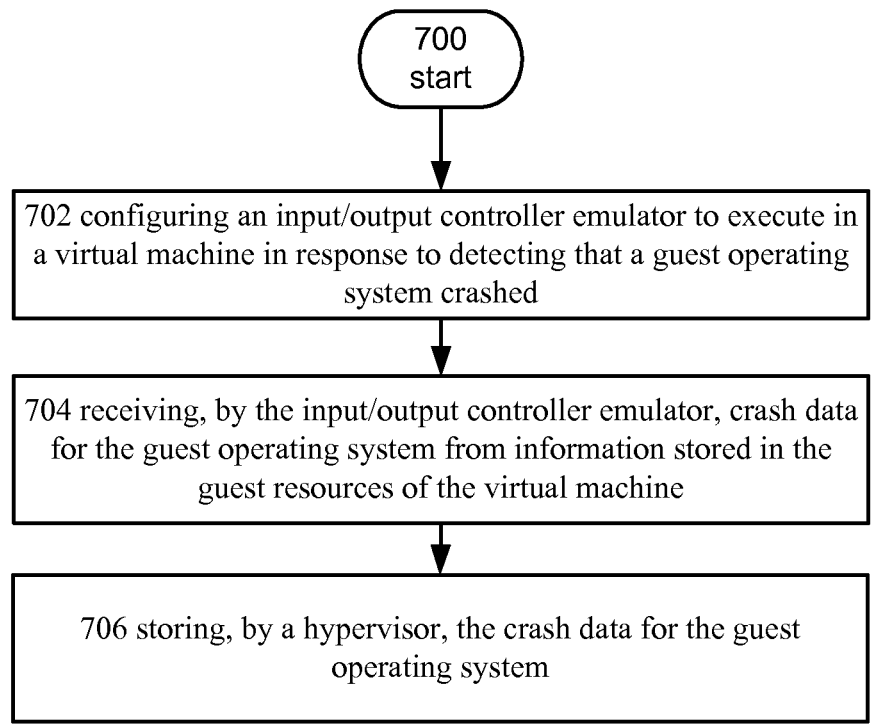
FIG. 7 depicts operational procedure for practicing aspects of the present disclosure.

Turning now to FIG. 7 it illustrates an operational procedure for practicing aspects of the present disclosure including operations 700, 702, 704, and 706. Operation 700 begins the operational procedure and operation 702 shows configuring an input/output controller emulator to execute in a virtual machine in response to detecting that a guest operating system crashed. For example, and turning to FIG. 4, IO controller emulator 426 can be loaded into guest memory and hypervisor 400 can set hypervisor intercepts for registers and memory mapped IO associated with the IO controller emulator 426. In this example, if IO driver 416 touches the resources a hypervisor intercept will occur and hypervisor 400 will transfer the information that the driver attempted to write to IO controller emulator 426. IO controller emulator 426 can then run through a state machine and emulate the behavior of an IO controller.

Continuing with the description of FIG. 7, operation 704 shows receiving, by the input/output controller emulator, crash data for the guest operating system from information stored in the guest resources of the virtual machine. Continuing with the example above, if a crash is detected virtual machine 420 can be stopped by hypervisor 400 and IO controller driver 416 can run and write crash data to IO controller emulator 426. In this example embodiment crash agent 418 could be configured to direct guest operating system 404 to load IO controller driver 416, e.g., an IDE controller driver, and pre-initialize it to operate as a crash stack. Guest operating system 404 could then pre-initialize IO controller driver 416 to run the guest OS's crash data generating program upon crash.

Turning now to operation 706, it shows storing, by a hypervisor, the crash data for the guest operating system. For example, after hypervisor 400 receives the crash data from IO controller emulator 426, it can be stored. In an example embodiment crash service 402 can store the file in storage 106.

Figure 8:
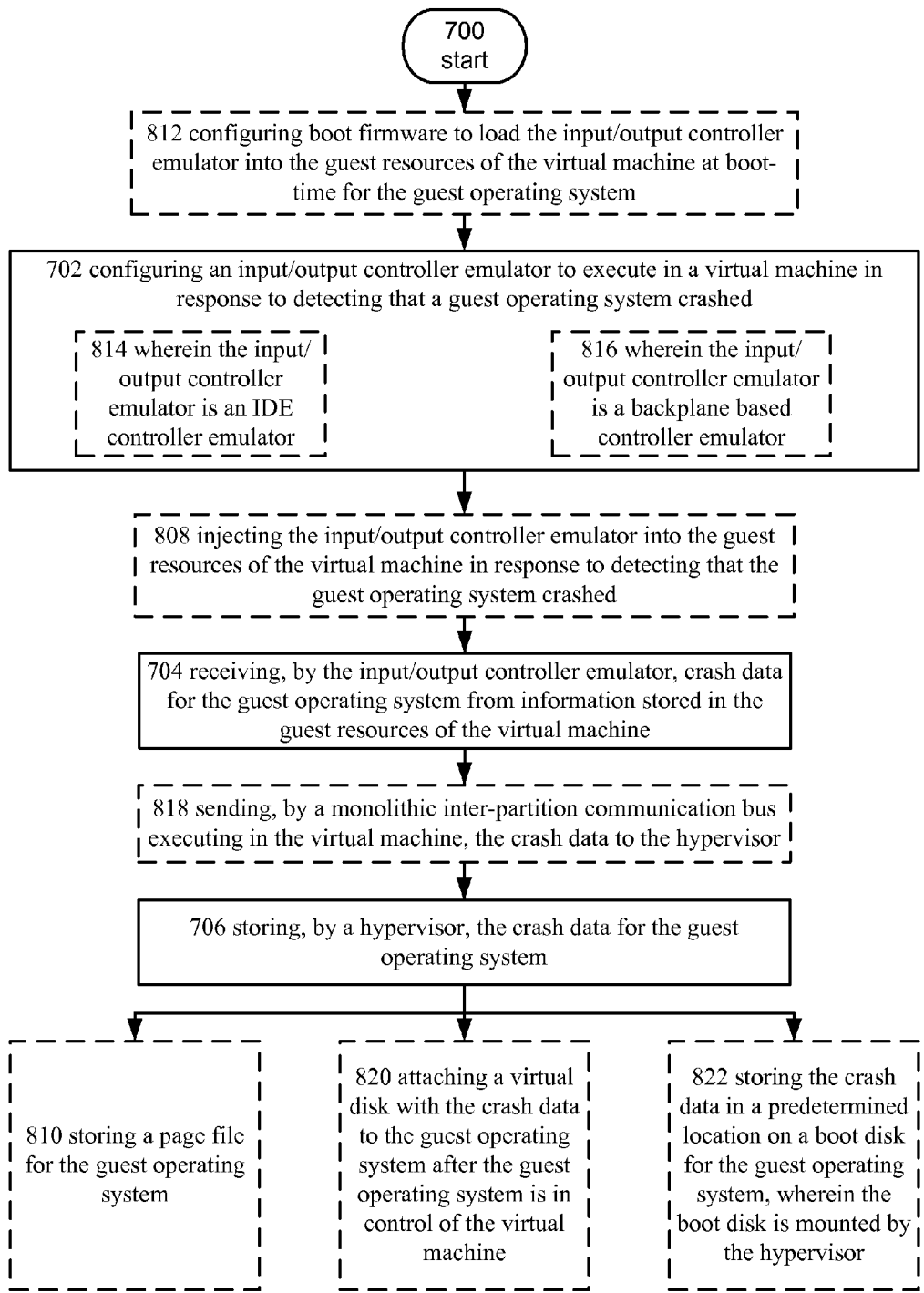
FIG. 8 depicts an alternative embodiment of the operational procedure of FIG. 7.

Turning now to FIG. 8, it illustrates an alternative embodiment of the operational procedure of FIG. 7 including operations 808-822. Operation 808 shows injecting the input/output controller emulator into the guest resources of the virtual machine in response to detecting that the guest operating system crashed. For example, in an embodiment of the present disclosure IO controller emulator 426 can be copied into guest the guest resources of virtual machine 420 when a crash is detected by crash agent 418 and configured to run.

For example, boot-firmware could configure guest operating to register certain resources such as IO ports and memory mapped IO as attached to the IO controller emulator 426. When a crash occurs IO controller driver 416 can run and touch the ports causing one or more hypervisor intercepts. Hypervisor 400 in this example can then inject IO controller emulator 426 into guest physical addresses along with the information written by the driver 426 and run IO controller emulator 426 on a virtual processor. In an example embodiment additional guest physical addresses can be added to virtual machine 420 at crash that contain the IO controller emulator 426. In other example embodiments, the guest physical addresses used to eventually store an IO controller emulator can be reserved at boot time or the guest physical addresses could be ballooned such that the memory can be allocated elsewhere. In this case the memory manager of guest operating system 404 would include information that the addresses are valid, however the addresses may not be backed by system physical addresses until a crash is detected and the memory is needed. In either example configuration IO controller emulator 426 can be injected into virtual machine 420 without disturbing the contents of the guest's memory because it will be placed in memory that is not used.

Continuing with the description of FIG. 8, operation 810 shows storing a page file for the guest operating system. For example, in an embodiment of the present disclosure the contents of the page file can be stored in the crash data. Some operating systems store the crash data on the area of the boot disk where the page table of the file system is stored; however, since hypervisor 400 is storing the crash data the page file does not have to be overwritten. In this example crash agent 418 or crash service 402 can be configured to obtain the blocks of data that includes the page file and store it in crash data. For example, by having the page file a person may identify what was paged out and this may make it easier to determine what caused the crash.

Continuing with the description of FIG. 8, operation 812 shows configuring boot firmware to load the input/output controller emulator into the guest resources of the virtual machine at boot-time for the guest operating system. For example, in an embodiment of the present disclosure IO controller emulator 426 can be stored in guest physical addresses of virtual machine 420 when guest operating system 404 boots. For example, boot firmware can report to guest operating system 404 that IO ports associated with the input/output emulator 406 are reserved by the motherboard and that the guest physical addresses containing the emulator are unusable. In this way guest operating system 404 will not attempt to write to the guest physical memory including the emulator or access the IO ports.

Continuing with the description of FIG. 8, operation 814 shows wherein the input/output controller emulator is an IDE controller emulator. In an example embodiment IO controller emulator 426 can be an IDE controller emulator. For example, guest operating system 404 could be configured to boot from a non-IDE based storage device, e.g., an iSCSI target. After guest operating system 404 loads crash agent 418 can invoke the process guest uses to configure the crash stack. Guest operating system 404 can be configured to load a copy of an IDE driver and pre-initialize it as the crash stack and to use IO controller emulator 426 as its storage device.

Continuing with the description of FIG. 8, operation 816 shows wherein the input/output controller emulator is a backplane based controller emulator. In an example embodiment the IO controller emulator can be a SCSI controller emulator. For example, guest operating system 404 could be configured to boot from a LUN of a SAN and virtualization storage service 408 could be injecting a SCSI disk into virtual machine 420. In an example embodiment crash agent 418 could be configured to invoke the process guest uses to configure the crash stack. Guest operating system 404 can be configured to load a shadow copy of an SCSI driver and pre-initialize it as the crash stack and to use IO controller emulator 426 as its storage device In another specific example embodiment crash agent 418 could configure guest operating system 404 to use the existing SCSI driver as the crash stack. In this specific example, protocol based IO controller driver 412 could essentially be IO controller driver 416.

Continuing with the description of FIG. 8, operation 818 shows sending, by a monolithic inter-partition communication bus executing in the virtual machine, the crash data to the hypervisor. For example, in an embodiment of the present disclosure a monolithic copy of an inter-partition bus can be loaded and used by IO controller emulator 426 to send crash data to hypervisor 400. For example, boot firmware 430 could load monolithic inter-partition bus 432 into guest physical memory. Upon crash, hypervisor 400 can stop the virtual machine and hypervisor 400 can attach IO controller emulator 426 to, for example virtualization storage service 408 via monolithic inter-partition bus 432 to virtual machine storage service 408. Virtualization storage service 408 could receive the crash data.

Continuing with the description of FIG. 8, operation 820 shows attaching a virtual disk with the crash data to the guest operating system after the guest operating system is in control of the virtual machine. For example, in an embodiment of the present disclosure hypervisor 400 may store the crash data and send it to guest operating system 404 after it reboots. In this example hypervisor 400 may be configured to attach disk 428 that includes the crash data to guest operating system 404. For example, if the file system of boot disk 422 is encrypted and hypervisor 400 does not have the encryption keys or hypervisor 400 does not have access to the boot disk, e.g., an iSCSI target, hypervisor 400 can use mountable disk 428 to send the crash data to the guest operating system 404.

After guest operating system 404 reboots and is running in virtual machine 420, crash service 402 can send a message to virtualization storage service 408 directing it to attach virtual disk 428 that contains the crash data to an inter-partition communication bus and to virtualization storage client 424. Guest operating system 404 can detect virtual disk 428 as a new storage disk. Crash service 402 can send a signal to crash client 418 directing it to access virtual disk 428 and obtain the crash data. Crash agent 418 can then send a request to guest operating system 404 to write the crash data to boot disk 422. Crash agent 418 can also be configured to invoke the crash analysis program if the guest operating system 404 includes one and send it a copy of the crash data.

Turning now to operation 822, it shows storing the crash data in a predetermined location on a boot disk for the guest operating system, wherein the boot disk is mounted by the hypervisor. For example, in an example embodiment virtualization storage service 408 can mount, e.g., open, boot disk 422 within the context of the hypervisor 400. After the disk is mounted, crash service 402 instructions of hypervisor 400 can be executed and the crash data can be stored a predetermined location on boot disk 422. For example, in an embodiment guest operating system 404 may store crash data in its page file. In this example the predetermined location on boot disk 422 could be the blocks that back the page file in the file system of guest operating system 404. After the crash data is written to virtual machine disk 422 guest operating system 404 can reboot and detect the crash data in the page file. The guest operating system 404 can then move the crash data to a location and invoke any crash analysis program it may have.

Figure 9:
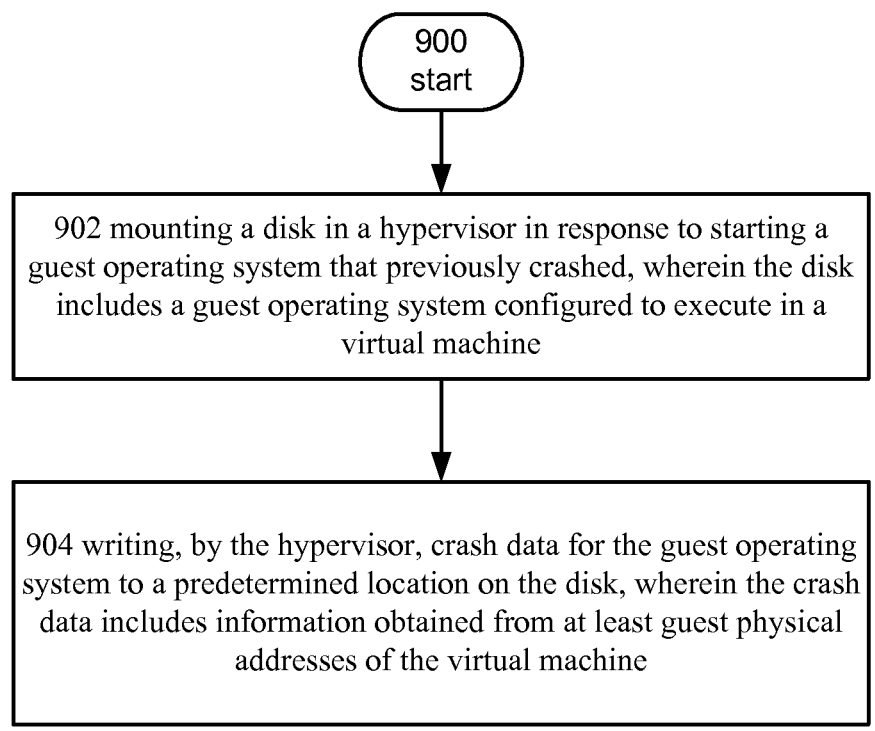
FIG. 9 depicts operational procedure for practicing aspects of the present disclosure.

Turning now to FIG. 9, it shows an operational procedure for practicing aspects of the present disclosure including operations 900, 902, and 904. Operation 900 begins the operational procedure and operation 902 shows mounting a disk in a hypervisor in response to starting a guest operating system that previously crashed, wherein the disk includes a guest operating system configured to execute in a virtual machine. For example, in an example embodiment virtualization storage service 408 can mount, e.g., open, virtual machine boot disk 422 within the context of the hypervisor 400. In this example embodiment virtual machine disk 422 could include the file system for guest operating system 404. In an example embodiment boot disk 422 may have been mounted after guest operating system attempts to reboot. In this example virtual machine firmware 430 could obtain access to boot disk 422 and may have passed access to hypervisor 400. In another example embodiment, one in which virtualization storage service 408 is managing storage for guest operating system 404, the boot disk 422 could have been mounted upon crash.

Crash data could have been sent to crash service 402 by, for example, IO controller driver 416. In an embodiment crash agent 418 could have been configured to detect crashes. For example, IO controller driver 416 could generate crash data and send it over to hypervisor 400 along with information that describes where on disk the information should be written. In another example embodiment crash service 402 could access guest memory upon crash and generate crash data from guest memory. Crash service 402 could also include information that describes where on the disk the information should be written.

Turning now to operation 904 of FIG. 9, it shows writing, by the hypervisor, crash data for the guest operating system to a predetermined location on the disk, wherein the crash data includes information obtained from at least guest physical addresses of the virtual machine. For example, after the disk is mounted, crash service 402 instructions of hypervisor 400 can be executed and the crash data can be stored a predetermined location on boot disk 422 according to the information that describes where on the disk the information should be written. For example, in an embodiment guest operating system 404 may store crash data in its page file. In this example the predetermined location on boot disk 422 could be the blocks that back the page file in the file system of guest operating system 404. After the crash data is written to virtual machine disk 422 guest operating system 404 can reboot and detect the crash data in the page file. The guest operating system 404 can then move the crash data to a location and invoke any crash analysis program it may have.

Figure 10:
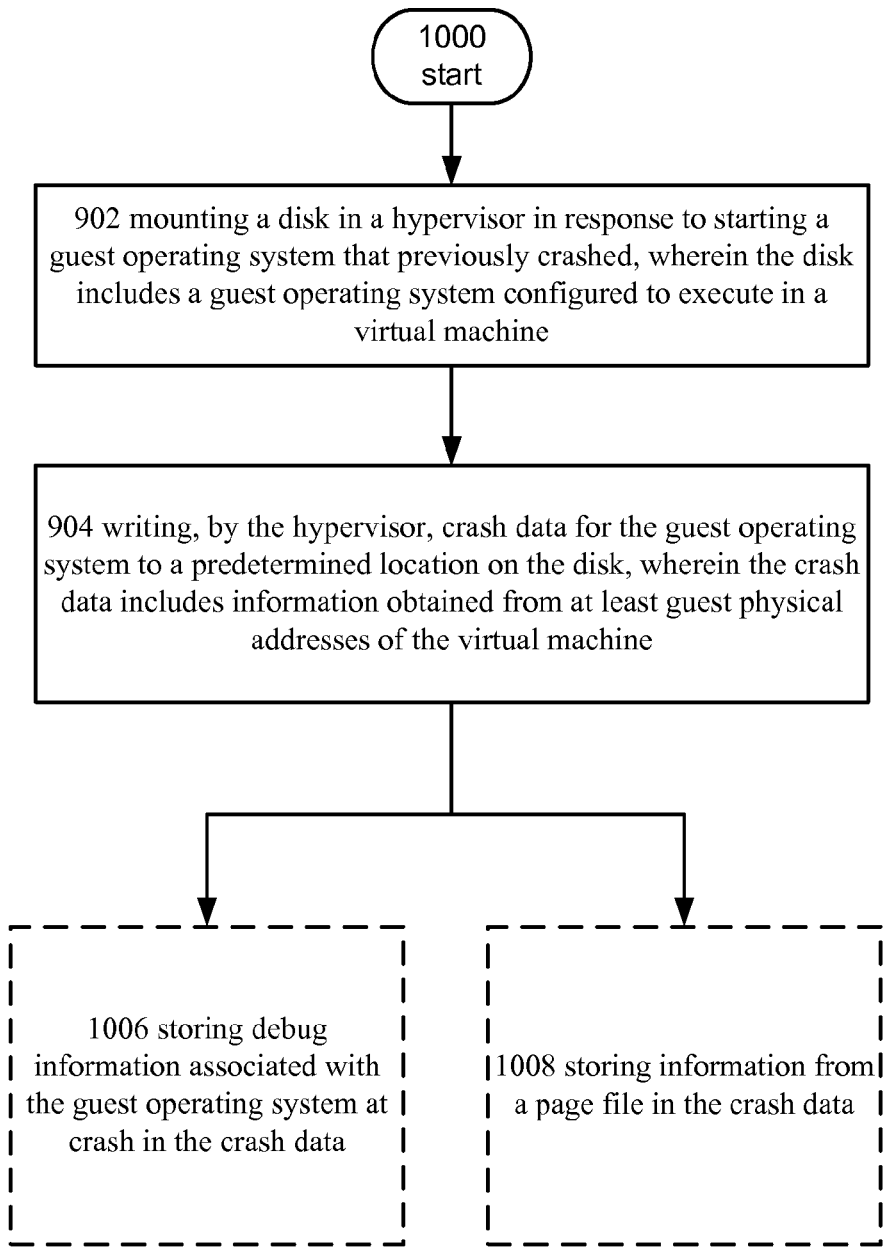
FIG. 10 depicts an alternative embodiment of the operational procedure of FIG. 9.

Turning now to FIG. 10 it shows an alternative embodiment of the operational procedure of FIG. 9 including additional operations 1006 and 1008. Operation 1006 shows storing debug information associated with the guest operating system at crash in the crash data. For example, in an embodiment of the present disclosure a component in virtual machine 420, e.g., crash agent 418, can be configured, e.g., programmed, to obtain debug metadata and send it to hypervisor 400. This operation can be useful in the situation where hypervisor 400 creates the crash data. In an example embodiment the debug metadata can identify the version of the kernel and a file which contains symbolic debugging information. The symbolic information can allow a debugger to find the kernel's internal data structures and begin to parse them.

Continuing with the description of FIG. 10, operation 1008 shows storing information from a page file in the crash data. For example, in an embodiment of the present disclosure the contents of the page file can be stored in the crash data. Some operating systems store the crash data on the area of the boot disk where the page table of the file system is stored; however, since hypervisor 400 is storing the crash data the page file does not have to be overwritten. In this example crash agent 418 or crash service 402 can be configured to obtain the blocks of data that includes the page file and store it in crash data. For example, by having the page file a person may identify what was paged out and this may make it easier to determine what caused the crash.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A computer system, comprising:
    circuitry for configuring a communications bus to transmit crash data from a guest operating system, the communications bus not reliant on resources of the guest operating system, the guest operating system configured to execute in a virtual machine, the crash data generated by the action of an IO (Input/Output) controller driver, wherein an IO controller emulator is injected into the virtual machine in response to detecting that the guest operating system has crashed;
    circuitry for configuring a hypervisor to obtain crash data for the guest operating system in response to detecting that the guest operating system crashed; and
    circuitry for configuring the hypervisor to send the crash data to the virtual machine after the guest operating system is in control of the virtual machine.

2. The computer system of claim 1, further comprising:
    circuitry for configuring the virtual machine to send debug metadata associated with the guest operating system to the hypervisor.

3. The computer system of claim 1, further comprising:
    circuitry for collocating the crash data with saved state information for the virtual machine.

4. The computer system of claim 1, further comprising:
    circuitry for disabling an encryption filter of an input/output driver configured to obtain the crash data.

5. The computer system of claim 1, wherein the communications bus is a monolithic inter-partition communication bus, further comprising:
    circuitry for receiving crash data from the IO controller driver via the monolithic inter-partition communication bus, wherein the IO controller driver includes the monolithic inter-partition communication bus.

6. The computer system of claim 1, wherein the circuitry for configuring the hypervisor to obtain the crash data further comprises:
    circuitry for accessing, by the hypervisor, guest physical addresses of the virtual machine and generating the crash data.

7. The computer system of claim 1, further comprising:
    circuitry for storing information from a page file in the crash data.

8. The computer system 1, further comprising:
    circuitry for executing an input/output emulator in the virtual machine, wherein an input/output driver is configured to write the crash data to the input/output emulator.

9. A computer method, comprising:
    configuring a communication bus to transmit crash data from a guest operating system, the communications bus not reliant on resources of the guest operating system, the guest operating system configured to execute in a virtual machine, the crash data generated by the action of an IO (Input/Output) controller driver, wherein an IO controller emulator is injected into the virtual machine in response to detecting that the guest operating system has crashed;
    configuring a hypervisor to obtain crash data for the guest operating system in response to detecting that the guest operating system crashed; and
    configuring the hypervisor to send the crash data to the virtual machine after the guest operating system is in control of the virtual machine.

10. The computer method of claim 9 wherein the injecting comprises adding guest physical addresses to contain memory associated with the input/output controller emulator.

11. The computer method of claim 9, further comprising:
    storing a page file for the guest operating system.

12. The computer method of claim 9, further comprising:
    configuring boot firmware to load the input/output controller emulator into a guest resources of the virtual machine at boot-time for the guest operating system.

13. The computer method of claim 9, wherein the input/output controller emulator is an IDE controller emulator.

14. The computer method of claim 9, wherein the input/output controller emulator is a backplane based controller emulator.

15. The computer method of claim 9, further comprising:
    sending, by a monolithic inter-partition communication bus executing in the virtual machine, the crash data to the hypervisor.

16. The computer method of claim 9, further comprising:
    attaching a virtual disk with the crash data to the guest operating system after the guest operating system is in control of the virtual machine.

17. The computer system of claim 9, wherein storing the crash data further comprises:
    storing the crash data in a predetermined location on a boot disk for the guest operating system, wherein the boot disk is mounted by the hypervisor.

18. A computer readable physical storage device including executable instructions, the computer readable physical storage device comprising:
    instructions for configuring a communication bus to transmit crash data from a guest operating system, the communications bus not reliant on resources of the guest operating system, the guest operating system configured to execute in a virtual machine, the crash data generated by the action of an IO (Input/Output) controller driver, wherein an IO controller emulator is injected into the virtual machine in response to detecting that the guest operating system has crashed;
    instructions for configuring a hypervisor to obtain crash data for the guest operating system in response to detecting that the guest operating system crashed; and
    instructions for configuring the hypervisor to send the crash data to the virtual machine after the guest operating system is in control of the virtual machine.

19. The computer readable physical storage device of claim 18, further comprising:
    instructions for storing debug information associated with the guest operating system at crash in the crash data.

20. The computer readable physical storage device of claim 18, further comprising:
    instructions for storing information from a page file in the crash data.

* * * * *